(12) United States Patent
Kouhshahi et al.

(10) Patent No.: US 12,149,131 B2
(45) Date of Patent: Nov. 19, 2024

(54) MOTOR POSITION SENSING SYSTEM FOR ROTATING ELECTRIC MACHINES

(71) Applicant: Steering Solutions IP Holding Corporation, Saginaw, MI (US)

(72) Inventors: Mojtaba Bahrami Kouhshahi, Ann Arbor, MI (US); Mohammed (Rakib) Islam, Saginaw, MI (US); Jeffrey T. Klass, Kawkawlin, MI (US); Steven J. Collier-Hallman, Frankenmuth, MI (US); Md. Zakirul Islam, San Jose, CA (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 264 days.

(21) Appl. No.: 17/750,597

(22) Filed: May 23, 2022

(65) Prior Publication Data

US 2023/0378851 A1    Nov. 23, 2023

(51) Int. Cl.
*H02K 11/215* (2016.01)
*H02K 7/00* (2006.01)
*H02K 29/08* (2006.01)

(52) U.S. Cl.
CPC .......... *H02K 11/215* (2016.01); *H02K 7/003* (2013.01); *H02K 29/08* (2013.01)

(58) Field of Classification Search
CPC .. H02K 1/22; H02K 1/24; H02K 1/27; H02K 1/2706; H02K 1/2713; H02K 1/2726;
(Continued)

(56) References Cited

U.S. PATENT DOCUMENTS

| 8,853,907 B2 * | 10/2014 | Palmer | H02K 16/00 310/114 |
| 10,790,726 B2 * | 9/2020 | Diemunsch | F04D 19/007 310/58 |

(Continued)

FOREIGN PATENT DOCUMENTS

| CN | 106487136 A | * | 3/2017 | ............. B29C 70/48 |
| CN | 109072929 B | * | 2/2021 | ............. F04D 17/16 |

(Continued)

OTHER PUBLICATIONS

CN106487136A—Translation (Year: 2024).*
(Continued)

*Primary Examiner* — Naishadh N Desai
*Assistant Examiner* — Ahmed F Seck
(74) *Attorney, Agent, or Firm* — Dickinson Wright PLLC

(57) ABSTRACT

An electric machine includes a rotor structure disposed within a motor housing, wherein a second rotor end has a plurality of axially stacked laminations. The electric machine further includes a motor position sensor system which includes a first plurality of cutouts defined in the plurality of axially stacked laminations, wherein the first plurality of cutouts have a progressively smaller cross-sectional area at each lamination. The motor position sensor system also includes a second plurality of cutouts defined in the plurality of axially stacked laminations, wherein the second plurality of cutouts have a progressively smaller cross-sectional area at each lamination. The motor position sensor system further includes a plurality of motor sensors axially spaced from the second rotor end, and a plurality of sensor magnets axially spaced from the second rotor end and the plurality of motor sensors.

20 Claims, 5 Drawing Sheets

(58) Field of Classification Search
CPC .... H02K 1/2733; H02K 1/274; H02K 1/2746;
H02K 1/276; H02K 1/278; H02K 7/003;
H02K 7/1807; H02K 11/0094; H02K
11/20; H02K 11/21; H02K 11/215; H02K
11/24; H02K 15/03; H02K 21/12; H02K
21/14; H02K 21/22; H02K 23/40; H02K
23/42; H02K 29/03; H02K 29/06; H02K
29/08; H02K 29/14; H02K 35/02; H02K
37/04; H02K 37/10; H02K 37/12; H02K
2201/15; H02K 2211/00; H02K 2211/03
See application file for complete search history.

(56) References Cited

U.S. PATENT DOCUMENTS

| | | | | |
|---|---|---|---|---|
| 2003/0201137 | A1* | 10/2003 | Crapo | B62D 5/0403 180/444 |
| 2014/0300217 | A1* | 10/2014 | Lim | H02K 16/04 310/43 |
| 2019/0229600 | A1* | 7/2019 | Woo | H02K 29/08 |
| 2020/0244120 | A1* | 7/2020 | Gutjahr | H02K 1/04 |
| 2021/0018227 | A1* | 1/2021 | Shimokawa | F25B 1/04 |
| 2022/0021278 | A1* | 1/2022 | Klassen | H02K 11/21 |
| 2022/0416599 | A1* | 12/2022 | Pagoni | H02K 15/03 |
| 2024/0192030 | A1* | 6/2024 | Kant | H02K 11/21 |

FOREIGN PATENT DOCUMENTS

| | | | | |
|---|---|---|---|---|
| DE | 102017218153 B3 | * | 2/2019 | ............ H02K 1/04 |
| EP | 3136565 A1 | * | 3/2017 | ............ B29C 70/48 |
| WO | WO-2008014112 A2 | * | 1/2008 | ........... H02K 21/145 |

OTHER PUBLICATIONS

17750597_2024-08-20_CN_109072929_B_H.pdf (Year: 2024).*
17750597_2024-08-20_DE_102017218153_B3_H.pdf(Year: 2024).*
17750597_2024-08-20_EP_3136565_A1_H.pdf (Year: 2024).*
17750597_2024-08-20_WO_2008014112_A2_H.pdf(Year: 2024).*

* cited by examiner

MOTOR POSITION SENSING SYSTEM FOR ROTATING ELECTRIC MACHINES

FIELD OF THE INVENTION

The present application generally relates to electric machines and, more particularly, to a motor position sensor system for electric machines.

BACKGROUND

Various types of rotating electric machines are used in a large number of applications. For example, permanent magnet synchronous machines (PMSMs) are widely used in electric drive applications owing to their high power density, superior control performance and reliability.

Rotor position sensing is crucial for efficient operation of PMSMs. For the rotor position sensing in PMSMs of some vehicle systems, the gear-tooth sensor (GTS) and permanent magnet-based sensor (PMS) are often used. Both of these sensing techniques are efficient and well developed. However, these sensing techniques require a separate arrangement and additional space apart from the active motor length. In addition, the permanent magnet-based rotor position sensor might suffer from issues related to the magnet falling off, being dislocated, and/or demagnetization, any of which will generate erroneous rotor position data.

The position sensor system is placed at the axial end of the housing in an EPS motor housing or propulsion system housing in the above-described systems. For both GTS-type and PMS-type sensor systems, a certain spatial isolation of the sensor system is required from the main motor. Therefore, the axial length of the motor housing increases significantly to incorporate the sensing system, as described below.

The components of a GTS-system typically include two sets of teeth arrangements made of magnetic material, two permanent magnets and two sets of magnetic sensors. The permanent magnets of the sensor system are magnetized towards the gear teeth. The magnetic sensor is placed in between the magnet and the gear-tooth. As the rotor and the magnetic gear rotate, the field of the sensor-magnet will experience variable reluctance path. The gears are shaped in such a way so that the sinusoidal output is generated in the magnetic sensor. The advantages of the GTS-system include robust mechanical structure and low cost. However, it is required to accommodate two permanent magnet and gear-tooth sets axially spaced on the shaft. Therefore, it increases the shaft length and axial length of the motor significantly.

The permanent magnet-based sensor system has a circular permanent magnet placed at the end of the shaft. Multiple hall sensors are placed in a circular path and at a certain axial distance from the magnet. The sensor will generate sinusoidal output signals which are post-processed to generate the exact rotor position. Though the performance of permanent magnet sensor is strong, the manufacturing cost is high, and it requires dedicated space at one end of the shaft. One issue with the PMS system is that the magnet may fall off or become slightly rotated or dislocated under higher operating speeds. In such a condition, the position sensing shows an erroneous result in predicting the motor position.

SUMMARY

According to one aspect of the disclosure, an electric machine includes a rotor structure disposed within a stator and a motor housing, the rotor structure extending from a first rotor end to a second rotor end, wherein the second rotor end has a plurality of axially stacked laminations. The electric machine also includes a motor output shaft operatively coupled to or integrally formed with the first rotor end. The electric machine further includes a motor position sensor system. The motor position sensor system includes a first plurality of cutouts defined in the plurality of axially stacked laminations at the second rotor end, wherein the first plurality of cutouts have a progressively smaller cross-sectional area at each lamination of the plurality of axially stacked laminations. The motor position sensor system also includes a second plurality of cutouts defined in the plurality of axially stacked laminations at the second rotor end, wherein the second plurality of cutouts have a progressively smaller cross-sectional area at each lamination of the plurality of axially stacked laminations, wherein the second plurality of cutouts are arranged radially outward of the first plurality of cutouts on the rotor structure. The motor position sensor system further includes a plurality of motor sensors axially spaced from the second rotor end. The motor position sensor system yet further includes a plurality of sensor magnets axially spaced from the second rotor end and the plurality of motor sensors, wherein the plurality of motor sensors and the plurality of sensor magnets are operatively coupled to a printed circuit board operatively coupled to the motor housing.

According to another aspect of the disclosure, an electric power steering (EPS) system for a vehicle includes a gear operatively connected to a steering system component to provide a mechanical assist to a steering effort. The EPS system also includes a permanent magnet synchronous machine (PMSM) having a rotor structure, the rotor structure disposed within a stator and a motor housing, the rotor structure extending from a first rotor end to a second rotor end, wherein the second rotor end has a plurality of axially stacked laminations. The EPS system further includes a motor output shaft operatively coupled to or integrally formed with the first rotor end, the motor output shaft operatively coupled to the gear to transfer power from the PMSM to the gear. The EPS system yet further includes a motor position sensor system. The motor position sensor system includes a first plurality of cutouts defined in the plurality of axially stacked laminations at the second rotor end, wherein the first plurality of cutouts have a progressively smaller cross-sectional area at each lamination of the plurality of axially stacked laminations. The motor position sensor system also includes a second plurality of cutouts defined in the plurality of axially stacked laminations at the second rotor end, wherein the second plurality of cutouts have a progressively smaller cross-sectional area at each lamination of the plurality of axially stacked laminations, wherein the second plurality of cutouts are arranged radially outward of the first plurality of cutouts on the rotor structure.

According to another aspect of the disclosure, a method of detecting a motor position of an electric machine. The method includes arranging a plurality of sensor magnets axially spaced from an end of a rotor structure, wherein the end of the rotor structure comprises a first plurality of cutouts and a second plurality of cutouts defined in a plurality of axially stacked laminations, wherein the first plurality of cutouts have a progressively smaller cross-sectional area at each lamination of the plurality of axially stacked laminations, and the second plurality of cutouts have a progressively smaller cross-sectional area at each lamination of the plurality of axially stacked laminations, wherein the second plurality of cutouts are arranged radially outward of the first plurality of cutouts on the rotor structure. The method also includes arranging a plurality of motor sensors between the end of the rotor structure and the plurality of sensor magnets. The method further includes generating a magnetic flux towards the laminations with the first and second plurality of cutouts to provide a variable reluctance path with the first and second plurality of cutouts as the rotor structure rotates. The method yet further includes detecting variation in the magnetic flux with a pair of output signals. The method also includes calculating an angular position of the rotor structure based on the pair of output signals.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
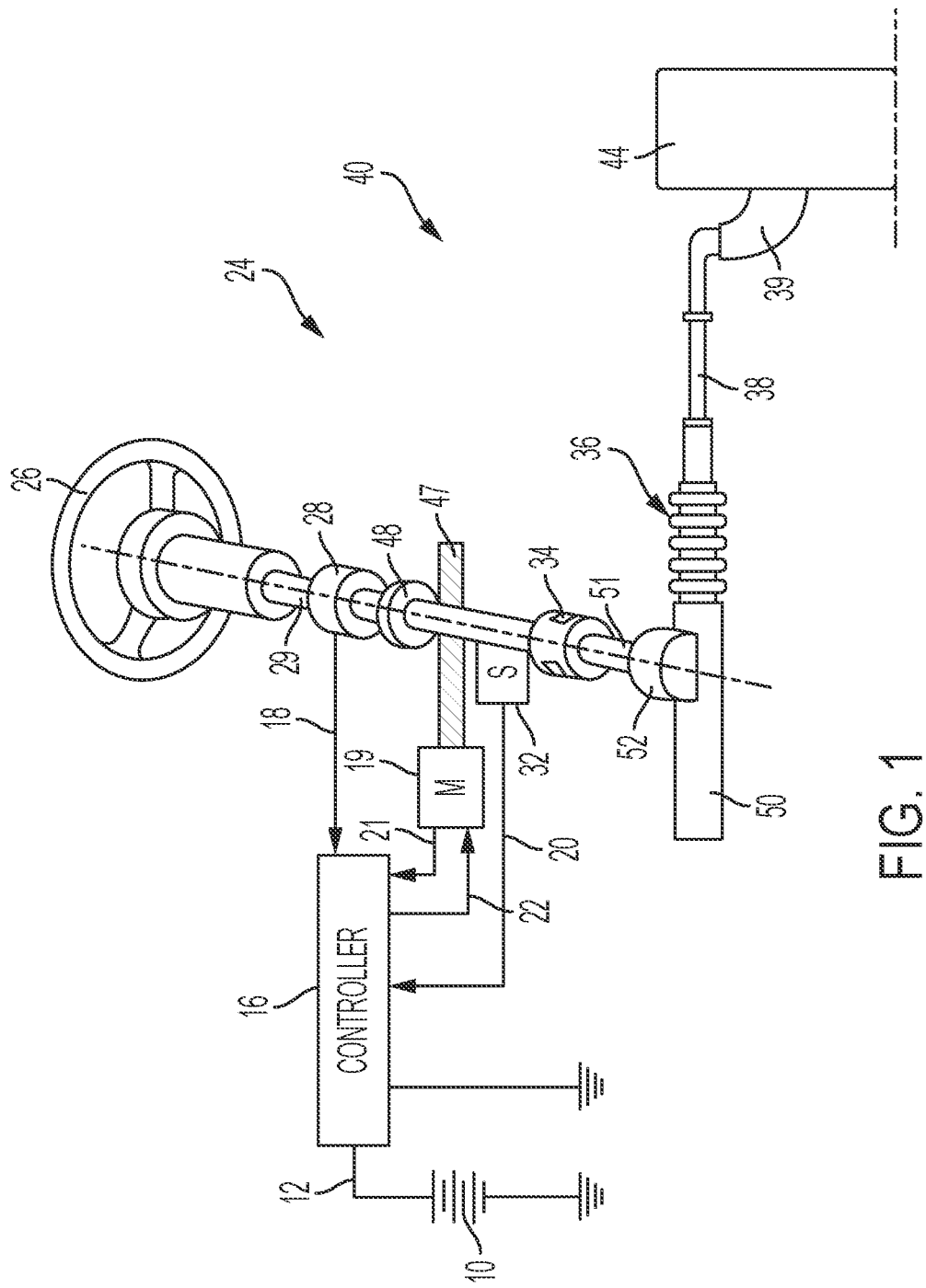
FIG. 1 schematically illustrates an electric power steering (EPS) system.

Referring to the Figures, where the invention will be described with reference to specific embodiments, without limiting same, FIG. 1 is an exemplary embodiment of an electric power steering (EPS) system 40 suitable for implementation of the disclosed embodiments. A steering mechanism 36 is a rack-and-pinion type system and includes a toothed rack (not shown) within a housing 50 and a pinion gear (also not shown) located under gear housing 52. As an operator input, hereinafter denoted as a steering wheel 26 (e.g., a hand wheel or the like) is turned, an upper steering shaft 29 turns and the lower steering shaft 51, connected to the upper steering shaft 29 through a universal joint 34, turns the pinion gear. Rotation of the pinion gear moves the rack, which moves tie rods 38 (only one shown), in turn moving steering knuckles 39 (only one shown), which turn steerable road wheel(s) 44 (only one shown).

Electric power steering assist is provided through the control apparatus generally designated by reference numeral 24 and includes a controller 16 and an electric machine 46, which is a permanent magnet synchronous motor, and is hereinafter denoted as motor 46. The controller 16 is powered by the vehicle power supply 10 through line 12. A steering angle is measured through a steering angle position sensor 32, which may be an optical encoding type sensor, variable resistance type sensor, or any other suitable type of position sensor, and supplies to the controller 16 a position signal 20.

As the steering wheel 26 is turned, torque sensor 28 senses the torque applied to the steering wheel 26 by the vehicle operator. The torque sensor 28 may include a torsion bar (not shown) and a variable resistive-type sensor (also not shown), which outputs a variable torque signal 18 to controller 16 in relation to the amount of twist on the torsion bar. Although this is one type of torque sensor, any other suitable torque-sensing device used with known signal processing techniques will suffice. In response to the various inputs, the controller sends a command 22 to the electric motor 46, which supplies torque assist to the steering system through worm 47 and worm gear 48, providing torque assist to the vehicle steering.

It should be noted that although the disclosed embodiments are described by way of reference to motor control for electric steering applications, it will be appreciated that such references are illustrative only and the disclosed embodiments may be applied to any motor control application employing an electric motor, e.g., steering, valve control, and the like. Moreover, the references and descriptions herein may apply to many forms of parameter sensors, including, but not limited to torque, position, speed and the like. It should also be noted that reference herein to electric machines including, but not limited to, motors, hereafter, for brevity and simplicity, reference will be made to motors only without limitation.

Velocity of the motor 46 may be measured with a tachometer, or any other device, and transmitted to controller 16 as a motor velocity signal 21. A motor velocity denoted $\omega_m$ may be measured, calculated or a combination thereof. For example, the motor velocity $\omega_m$ may be calculated as the change of the motor position θ as measured by a motor position sensor system 100 over a prescribed time interval. For example, motor speed $\omega_m$ may be determined as the derivative of the motor position θ from the equation $\omega_m = \Delta\theta/\Delta t$ where Δt is the sampling time and Δθ is the change in position during the sampling interval. Alternatively, motor velocity may be derived from motor position as the time rate of change of position. It will be appreciated that there are numerous well-known methodologies for performing the function of a derivative.

While FIG. 1 illustrates an embodiment with the motor position sensor system utilized in a steering system, it is to be understood that any type of rotating electric machine may beneficially have the motor position monitored and detected with the embodiments disclosed herein. This includes different vehicle systems, such as electric vehicle propulsion systems, for example. Additionally, the types of electric machines may be synchronous or asynchronous.

Figure 2:
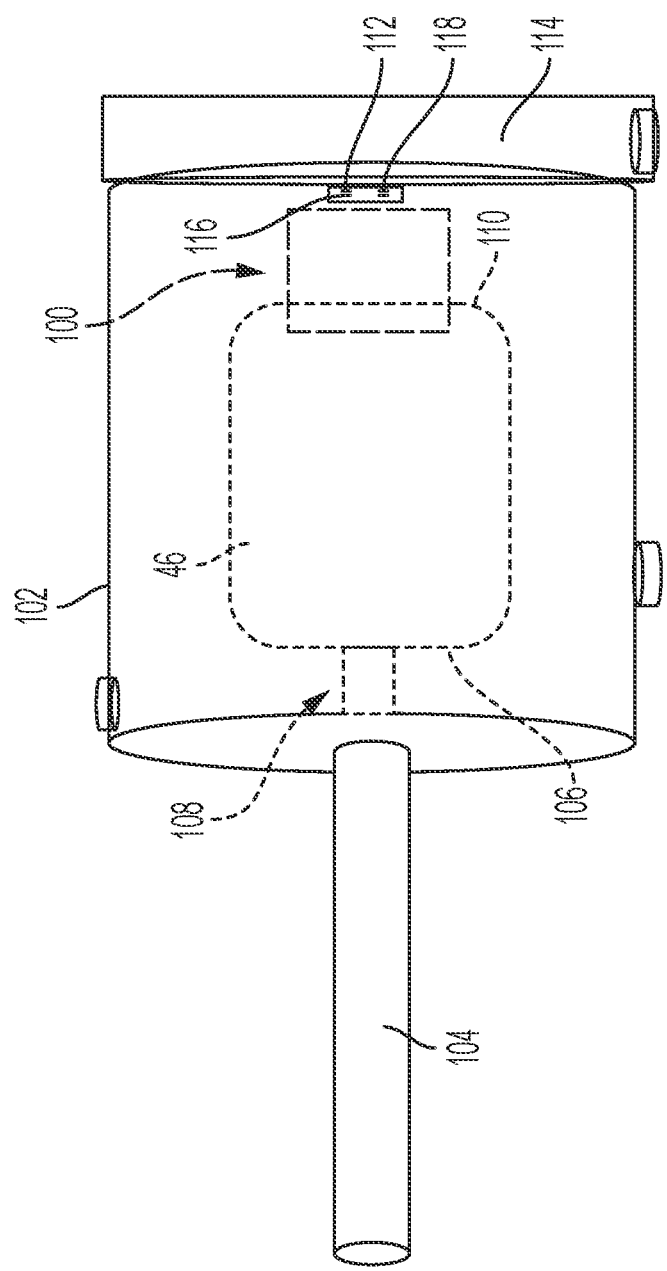
FIG. 2 is a perspective view of a motor of a vehicle system.

Referring now to FIG. 2, the motor 46 is shown in more detail. In particular, the motor 46 is shown within a motor housing 102 and has a motor output shaft 104 extending axially away from a first axial end 106 the motor 46. The motor output shaft 104 extends from a rotor structure 108 that rotates within a stator of the motor 46. In the illustrated embodiment of FIG. 1, the motor output shaft 104 is operatively coupled to, or integrally formed with the worm 47, but it is to be understood that the type of output driven by the motor 46 may vary since other applications of PMSMs are contemplated, as described herein.

The motor position sensor system 100 is located within the motor housing 102 at a second axial end 110 of the motor 46. In contrast to motor position sensor systems that require substantial extension of the rotor structure 108 on the second axial end 110 of the motor 46, the motor position sensor system 100 disclosed herein utilizes grooved rotor laminations to create a variable reluctance path, but eliminates the gear teeth that must be placed on an extension of the rotor structure 108, thereby reducing the necessary axial space of the motor housing 102 to provide a more compact design. In particular, the rotor structure 108 is formed of axially stacked laminations proximate the second axial end 110 of the motor 46. A printed circuit board (PCB) 112 is operatively coupled to the motor housing 102 at or proximate an end 114 of the motor housing 102 that is closest to the second axial end 110 of the motor 46. The PCB 112 includes a plurality of motor sensors 116 and magnets 118 that are used to detect the angular position of the rotor structure 108, which indicates the position of the motor 46.

Referring now to FIGS. 3-6, an embodiment of the motor position sensor system 100 is illustrated in greater detail. In the illustrated embodiment, the portion of the rotor structure 108 that is at the second axial end 110 of the motor 46 includes a plurality of axially stacked laminations 120. The plurality of axially stacked laminations 120 at the end of the rotor structure 108 each include cutouts which are referenced generally with numeral 122. The number of laminations 120 that include cutouts 122 may vary depending upon the particular application. Regardless of the number of laminations containing cutouts 122, the cross-sectional area of the cutouts decreases from one lamination to the next in a direction away from the lamination at the end of the rotor structure 108. In other words, the end-most lamination contains cutouts 122 with a cross-sectional area that is greater than the cross-sectional area at an adjacent lamination. As dimensionally shown in FIG. 6, a first lamination 124 that corresponds to the end-most lamination defines a first cutout 126 that includes a first cross-sectional area. A second lamination 128 that is adjacent to the first lamination 124 defines a second cutout 130 that has a second cross-sectional area that is smaller than the first cross-sectional area. A third lamination 132 that is adjacent to the second lamination 128 defines a third cutout 134 that has a third cross-sectional area that is smaller than the second cross-sectional area.

Figure 6:
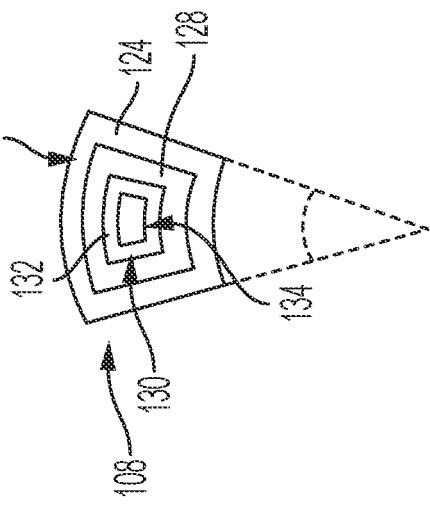
FIG. 6 is a plan view of a portion of the motor position sensor system of FIGS. 3-5.
Figure 7:
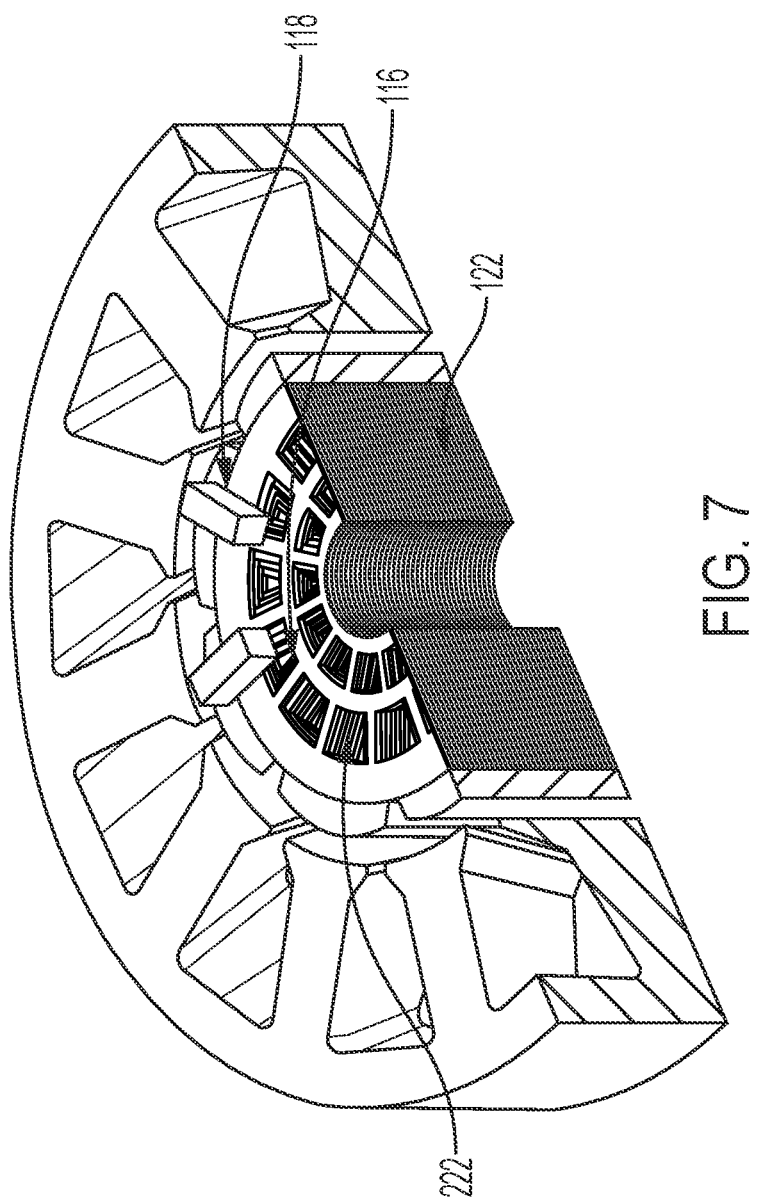
FIG. 7 is a perspective view of the motor position sensor system according to another aspect of the disclosure.
Figure 9:
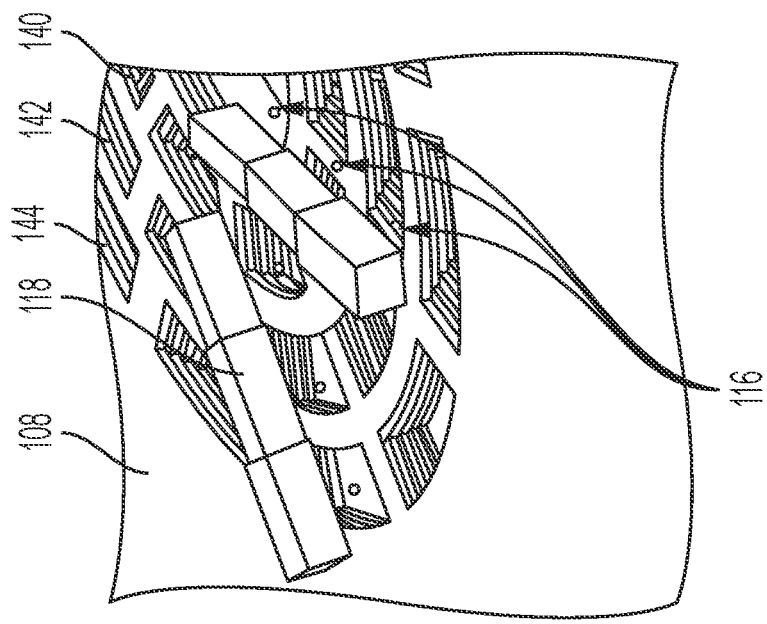
FIG. 9 is an enlarged view of a portion of the motor position sensor system of FIG. 8.

The cutouts 122 in the illustrated embodiments of FIGS. 3-6 are substantially trapezoidal, as shown well in FIG. 6. In particular, each cutout 122 defines a pair of substantially straight sidewalls and arcuate inner and outer walls which define an inner radius and an outer radius, respectively. While the trapezoidal cutouts 122 are illustrated in FIGS. 3-6, it is to be appreciated that alternative cutout shapes are certainly within the scope of the invention. By way of non-limiting example, FIG. 7 illustrates laminations of the rotor structure 108 that have substantially circular cutouts 222 defined therein. Other shapes are contemplated. In the illustrated embodiment, the decreasing cross-sectional area of the cutouts at each lamination results in what may be referred to as a "staircase recess".

Referring again to FIGS. 3 and 4, the cutouts 122 are arranged concentrically about each other to be in two circular rows. In particular, the cutouts 122 can be separately referred to as a first plurality of cutouts 140 that defines a first circular row and a second plurality of cutouts 142 that defines a second circular row. The first circular row is radially inward of the second row.

Figure 4:
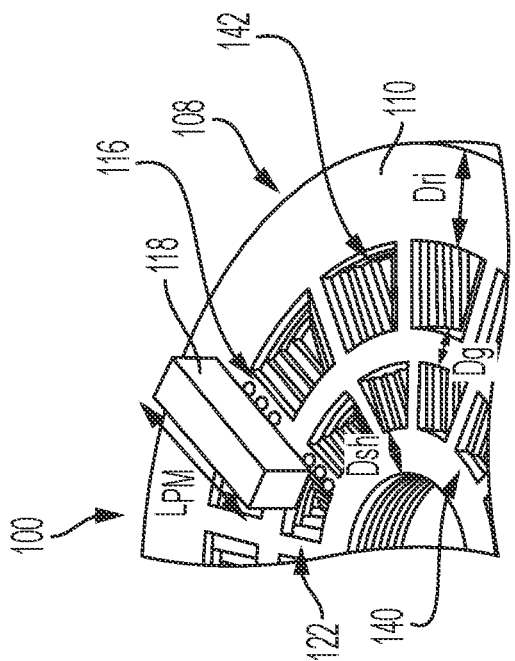
FIG. 4 is an enlarged view of a portion of the motor position sensor system of FIG. 3.
Figure 3:
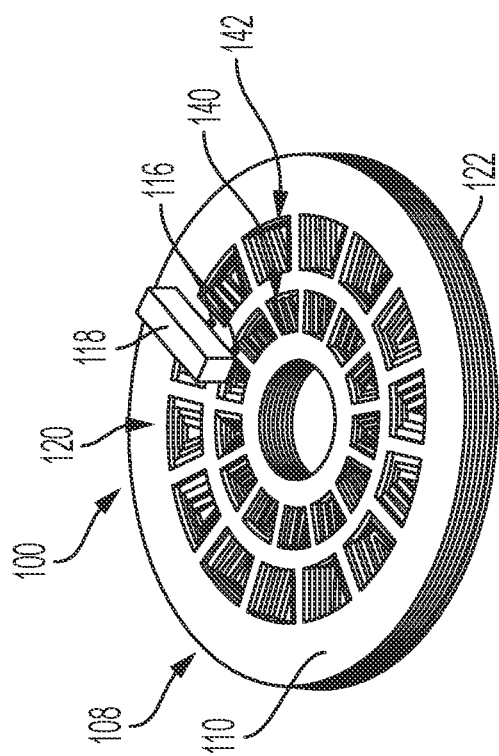
FIG. 3 is a perspective view of a motor position sensor system for the motor.
Figure 5:
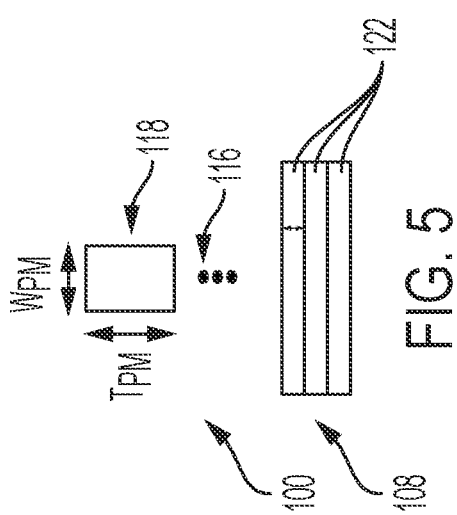
FIG. 5 is an elevational view of the motor position sensor system of FIGS. 3 and 4.

As shown in FIGS. 4 and 5, the PCB 112 includes a plurality of motor sensors 116 and magnets 118 positioned thereon. The motor sensors 116 and the magnets 118 axially spaced from the end of the rotor structure 108 and are used to detect the angular position of the rotor structure 108, which indicates the position of the motor 46. In particular, the magnets 118 are placed close to the rotor structure 108. This generates magnetic flux towards the laminations with the cutouts 122. The generated magnetic flux from the magnets 118 extends through a variable reluctance path as the rotor structure 108 rotates. Hence, a variation in the flux density components will be observed in between the magnets 118 and the rotor structure 108. The motor sensors 116 are magnetic sensors and are located between the magnets 118 and the rotor end to observe different flux density components. More particularly, the motor sensors 116 are separated into groups, with each group including at least one motor sensor that is axially spaced from the end of the rotor structure 108, but radially aligned with a respective cutout 122.

The laminations of the rotor structure 108 are cut and placement of the motor sensors 116 is made to provide two sets of sinusoidal output signals which can be extracted from the sensor output. The two sets of sinusoidal signals have their frequency differed by one. Therefore, the cutouts 122 are separated into two sets of cutouts in the form of the above-described first and second plurality of cutouts 140, 142. In the illustrated example, the first plurality of cutouts 140 has 13 cutouts and the second plurality of cutouts 142 has 14 cutouts. It is contemplated that other numbers of cutouts may be utilized so long as the number of cutouts (i.e., peaks and valleys) do not have any common integer divisor. Therefore, combinations of cutout rows of 9-10, 10-11, 13-14, and 17-18 are examples of combinations which are suitable to provide the above-described signal output response. Due to the radial positioning, the outer second plurality of cutouts 142 (i.e., radially outer cutouts) have a larger span compared to the first plurality of cutouts 140 (i.e., radially inner cutouts). Hence, the generated signal will also have a higher amplitude from the second plurality of cutouts 142 (i.e., radially outer set). The received signal level is adjusted properly during post-processing to match the amplitude of a final output signal corresponding to the inner and outer cutouts. Therefore, the sensing hall elements gain of the motor sensors 116 can be programmed appropriately.

Using a nonius algorithm, the sets of two sinusoids differing in frequency by 1 is converted to a position signal covering a 360-degree mechanical space. Sensors capturing cosine signals are in orthogonal location with respect to sensors producing sine signals. Again, using a nonius algorithm the signals can be converted to estimate the absolute rotor position. Calculating the arctangent of the signals allows the system to obtain the phase shift between the inner and outer cutouts at every point. The phase difference is the ultimate rotor position varying from 0 to 360 degrees in each mechanical revolution of the rotor structure 108.

With continued reference to FIGS. 4 and 5, in addition to the factors discussed above, there are several other geometrical parameters which are needed to obtain appropriate sinewaves. First, a minimum radial distance (Dg) between the cutouts of the first plurality of cutouts 140 and the second plurality of cutouts 142 must be present to avoid interference between the inner and outer sensors of the motor sensors 116 which correspond to the inner and outer sets of cutouts. In some embodiments, the minimum radial distance (Dg) is between 2 mm to 2.5 mm. The second geometric parameter is the distance (Dsh) from cutouts 122 to the motor output shaft 104, as well as the distance from the cutouts to the rotor magnet. For avoiding the interference of the main motor's magnetic field with the sensor system, the rotor yoke (Dri) should be thick enough to not saturate the rotor structure 108. To avoid the interference, the rotor yoke is higher than the stator yoke. Third, the position of the motor sensors 116 along the shaft and along the rotor radius must be considered to keep enough space for the printed circuit board 112. The distance of the motor sensors 116 from the magnets 118 is at least 1 mm in some embodiments. The amplitude of the sensor signal is influenced by the distance of the motor sensor 116 from the magnet 118. The radial position of the motor sensor 116 is also important in the proposed sensor system as the span of the core and cutout are not uniform. Therefore, motor sensors 116 at different radial positions will not be in the same reluctance path. Fourth, the magnet 118 must have a thickness (TPM) that is greater than the gap between the magnet 118 and the rotor structure 108. For the mentioned sensing, the gap between magnet 118 and rotor structure 108 is between 2.5 mm to 3 mm, whereas the thickness of the magnet 118 is taken to be 3 mm. The width of the magnet 118 is maintained to be close to the groove span of the top lamination. The disclosed dimensions are merely illustrative of an example embodiment and are not intended to be limiting.

Figure 8:
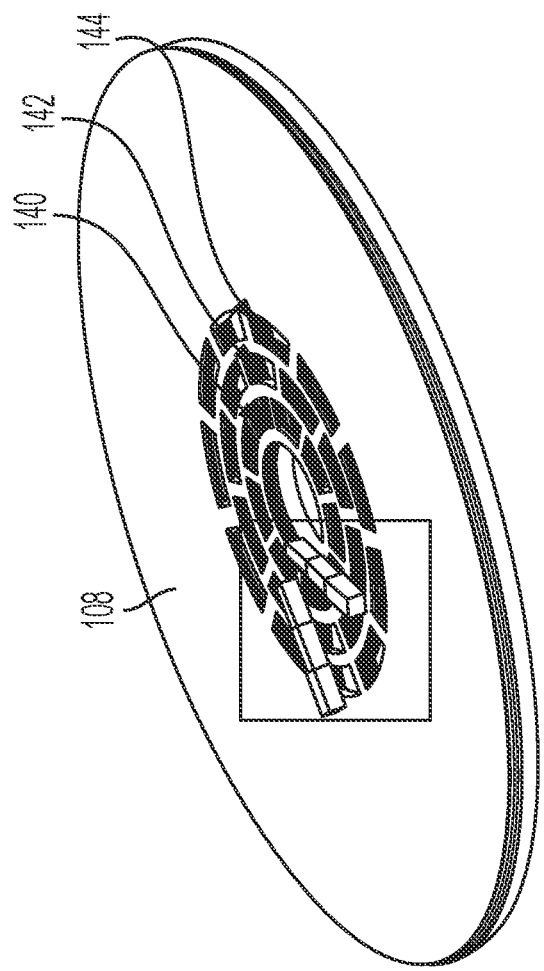
FIG. 8 is a perspective view of the motor position sensor system according to another aspect of the disclosure.

Referring now to FIG. 8, the motor position sensor system 100 could be made effective at higher operating speeds by adding a third plurality of cutouts 144 on the surface of the rotor structure 108. Therefore, a radially inner track 140, a middle track 142 and a radially outer track 144 are provided in the illustrated embodiment. It is contemplated that additional "tracks" may be provided in some embodiments. As with the two track embodiments discussed above, the illustrated trapezoidal cutouts may be formed as circles or some other shape. In embodiments having more than two pluralities of cutouts, speed and/or position sensing resolution is addressed with additional track(s). The principles remain the same as two cutout embodiments, but for certain positions of resolution/motor speed, two of the cutouts groups can be used, while another group of cutout tracks can be used for additional resolution/speed. For example, for certain position resolution/motor speed the first and second plurality of cutouts can be used, but for other resolution/speeds the second and third plurality of cutouts can be used. Even the first and third plurality of cutouts can be used as a combination for another resolution/speed range.

The embodiments disclosed herein utilize rotor laminations with cutouts 122 to create a variable reluctance path. The motor position sensor system 100 is integrated with the rotor structure 108 and makes the overall axial motor length shorter in comparison to prior systems, and hence, saves axial space and cost.

While the technical solutions are described in detail in connection with only a limited number of embodiments, it should be readily understood that the technical solutions are not limited to such disclosed embodiments. Rather, the technical solutions can be modified to incorporate any number of variations, alterations, substitutions, or equivalent arrangements not heretofore described, but which are commensurate with the spirit and scope of the technical solutions. Additionally, while various embodiments of the technical solutions have been described, it is to be understood that aspects of the technical solutions may include only some of the described embodiments. Accordingly, the technical solutions are not to be seen as limited by the foregoing description.

What is claimed is:
1. An electric machine comprising:
 a rotor structure disposed within a stator and a motor housing, the rotor structure extending from a first rotor end to a second rotor end, wherein the second rotor end has a plurality of axially stacked laminations;
 a motor output shaft operatively coupled to or integrally formed with the first rotor end; and
 a motor position sensor system comprising:
  a first plurality of cutouts defined in the plurality of axially stacked laminations at the second rotor end, wherein the first plurality of cutouts have a progressively smaller cross-sectional area at each lamination of the plurality of axially stacked laminations, wherein the plurality of axially stacked laminations comprises a first end lamination of the entire plurality of axially stacked laminations and a second end lamination of the entire plurality of axially stacked laminations, wherein the progressively smaller cross-sectional area of each of the first plurality of cutouts at each lamination occurs along an entirety of the axially stacked laminations from the first end lamination to the second end lamination;
  a second plurality of cutouts defined in the plurality of axially stacked laminations at the second rotor end, wherein the second plurality of cutouts have a progressively smaller cross-sectional area at each lamination of the plurality of axially stacked laminations, wherein the second plurality of cutouts are arranged radially outward of the first plurality of cutouts on the rotor structure, wherein the progressively smaller cross-sectional area of each of the second plurality of cutouts at each lamination occurs along an entirety of the axially stacked laminations from the first end lamination to the second end lamination;
  a plurality of motor sensors axially spaced from the second rotor end; and
  a plurality of sensor magnets axially spaced from the second rotor end and the plurality of motor sensors, wherein the plurality of motor sensors and the plurality of sensor magnets are operatively coupled to a printed circuit board operatively coupled to the motor housing.

2. The electric machine of claim 1, wherein the number of cutouts in the second plurality of cutouts is greater than the number of cutouts in the first plurality of cutouts.

3. The electric machine of claim 2, wherein the number of cutouts in the second plurality of cutouts is greater than the number of cutouts in the first plurality of cutouts by one.

4. The electric machine of claim 1, wherein the first plurality of cutouts and the second plurality of cutouts are each arranged in a respective circular pattern, wherein the second plurality of cutouts concentrically surrounds the first plurality of cutouts.

5. The electric machine of claim 1, wherein the first plurality of cutouts and the second plurality of cutouts are formed in a substantially trapezoidal cross-section.

6. The electric machine of claim 1, wherein the first plurality of cutouts and the second plurality of cutouts are formed in a substantially circular cross-section.

7. The electric machine of claim 1, wherein the plurality of motor sensors are separated into a plurality of groups, each of the plurality of groups comprising at least one sensor radially aligned with a respective cutout of the first plurality of cutouts and/or the second plurality of cutouts.

8. The electric machine of claim 1, wherein the electric machine is a permanent magnet synchronous machine.

9. The electric machine of claim 1, wherein the electric machine is part of an electric power steering (EPS) system of a vehicle.

10. The electric machine of claim 1, wherein the electric machine is part of an electric vehicle propulsion system.

11. The electric machine of claim 1, further comprising a third plurality of cutouts defined in the plurality of axially stacked laminations at the second rotor end, wherein the third plurality of cutouts have a progressively smaller cross-sectional area at each lamination of the plurality of axially stacked laminations, wherein the third plurality of cutouts are arranged radially outward of the second plurality of cutouts on the rotor structure.

12. An electric power steering (EPS) system for a vehicle comprising:
   a gear operatively connected to a steering system component to provide a mechanical assist to a steering effort;
   a permanent magnet synchronous machine (PMSM) having a rotor structure, the rotor structure disposed within a stator and a motor housing, the rotor structure extending from a first rotor end to a second rotor end, wherein the second rotor end has a plurality of axially stacked laminations;
   a motor output shaft operatively coupled to or integrally formed with the first rotor end, the motor output shaft operatively coupled to the gear to transfer power from the PMSM to the gear; and
   a motor position sensor system comprising:
      a first plurality of cutouts defined in the plurality of axially stacked laminations at the second rotor end, wherein the first plurality of cutouts have a progressively smaller cross-sectional area at each lamination of the plurality of axially stacked laminations, wherein the plurality of axially stacked laminations comprises a first end lamination of the entire plurality of axially stacked laminations and a second end lamination of the entire plurality of axially stacked laminations, wherein the progressively smaller cross-sectional area of each of the first plurality of cutouts at each lamination occurs along an entirety of the axially stacked laminations from the first end lamination to the second end lamination; and
      a second plurality of cutouts defined in the plurality of axially stacked laminations at the second rotor end, wherein the second plurality of cutouts have a progressively smaller cross-sectional area at each lamination of the plurality of axially stacked laminations, wherein the second plurality of cutouts are arranged radially outward of the first plurality of cutouts on the rotor structure, wherein the progressively smaller cross-sectional area of each of the second plurality of cutouts at each lamination occurs along an entirety of the axially stacked laminations from the first end lamination to the second end lamination.

13. The EPS system of claim 12, further comprising:
   a plurality of motor sensors axially spaced from the second rotor end; and
   a plurality of sensor magnets axially spaced from the second rotor end and the plurality of motor sensors, wherein the plurality of motor sensors and the plurality of sensor magnets are operatively coupled to a printed circuit board operatively coupled to the motor housing.

14. The EPS system of claim 12, wherein the number of cutouts in the second plurality of cutouts is greater than the number of cutouts in the first plurality of cutouts.

15. The EPS system of claim 14, wherein the number of cutouts in the second plurality of cutouts is greater than the number of cutouts in the first plurality of cutouts by one.

16. The EPS system of claim 12, wherein the first plurality of cutouts and the second plurality of cutouts are each arranged in a respective circular pattern, wherein the second plurality of cutouts concentrically surrounds the first plurality of cutouts.

17. The EPS system of claim 12, wherein the first plurality of cutouts and the second plurality of cutouts are formed in a substantially trapezoidal cross-section.

18. The EPS system of claim 12, wherein the first plurality of cutouts and the second plurality of cutouts are formed in a substantially circular cross-section.

19. The EPS system of claim 13, wherein the plurality of motor sensors are separated into a plurality of groups, each of the plurality of groups comprising at least one sensor radially aligned with a respective cutout of the first plurality of cutouts and/or the second plurality of cutouts.

20. A method of detecting a motor position of an electric machine, the method comprising:
   arranging a plurality of sensor magnets axially spaced from an end of a rotor structure, wherein the end of the rotor structure comprises a first plurality of cutouts and a second plurality of cutouts defined in a plurality of axially stacked laminations, wherein the first plurality of cutouts have a progressively smaller cross-sectional area at each lamination of the plurality of axially stacked laminations, and the second plurality of cutouts have a progressively smaller cross-sectional area at each lamination of the plurality of axially stacked laminations, wherein the second plurality of cutouts are arranged radially outward of the first plurality of cutouts on the rotor structure, wherein the plurality of axially stacked laminations comprises a first end lamination of the entire plurality of axially stacked laminations and a second end lamination of the entire plurality of axially stacked laminations, wherein the progressively smaller cross-sectional area of each of the first plurality of cutouts at each lamination occurs along an entirety of the axially stacked laminations from the first end lamination to the second end lamination, wherein the progressively smaller cross-sectional area of each of the second plurality of cutouts at each lamination occurs along an entirety of the axially stacked laminations from the first end lamination to the second end lamination;
   arranging a plurality of motor sensors between the end of the rotor structure and the plurality of sensor magnets;
   generating a magnetic flux towards the laminations with the first and second plurality of cutouts to provide a variable reluctance path with the first and second plurality of cutouts as the rotor structure rotates;
   detecting variation in the magnetic flux with a pair of output signals; and
   calculating an angular position of the rotor structure based on the pair of output signals.

* * * * *